Sept. 22, 1964 G. B. LINDERMAN Re. 25,646

LIGHT SHIELD FOR PINHOLE DETECTORS

Original Filed July 1, 1955 2 Sheets-Sheet 1

INVENTOR
GARRETT B. LINDERMAN

BY Raymond W. Colton
ATTORNEY

Sept. 22, 1964 G. B. LINDERMAN Re. 25,646

LIGHT SHIELD FOR PINHOLE DETECTORS

Original Filed July 1, 1955 2 Sheets-Sheet 2

INVENTOR

GARRETT B. LINDERMAN

BY Raymond Wholton

ATTORNEY

United States Patent Office

Re. 25,646
Reissued Sept. 22, 1964

25,646

LIGHT SHIELD FOR PINHOLE DETECTORS

Garrett B. Linderman, Washington, D.C., assignor to Linderman Engineering Company, Inc., a corporation of Maryland Original No. 2,820,908, dated Jan. 21, 1958, Ser. No. 519,541, July 1, 1955. Application for reissue Apr. 13, 1964, Ser. No. 367,914
10 Claims. (Cl. 250—229)

Matter enclosed in heavy brackets [ ] appears in the original patent but forms no part of this reissue specification; matter printed in italics indicates the additions made by reissue.

This invention relates to an improved light shield for pinhole detectors.

In view of the very small openings that must be sensed in connection with the detection of pinholes in tin plate in accordance with present day requirements, the sensitivity of the apparatus has become so high that false marking due to light leakage has become a major problem. In connection with light shields of the type disclosed by the patent to Hags, No. 2,395,181, dated February 19, 1946, it has been found through extended research, that the light reflected from the guide rollers engaging the edges of the strip to the photosensitive devices below, causes them to respond as though a pinhole had been detected in the strip itself. It is the principal object of the present invention to overcome such shortcomings of the prior art in a manner that will permit the use of high sensitivity equipment yet eliminate false marking produced by stray light, reflected or otherwise.

The problem would be simpler were it feasible to render the guide rollers of existing equipment light absorbing by the application of coatings. Such coatings would be removed rather quickly however through engagement with the work strip and the problem of light reflected from the guide rollers would soon recur. A more effective solution to the problem is achieved by masking the guide rollers so that all surface portions that would ordinarily reflect light to the photosensitive devices will be obscured. One way of accomplishing this result is by locating the guide rollers in positions misaligned with the light source and light sensitive device and masking substantial portions of the rollers so that any light that is reflected therefrom will be directed other than towards the light sensitive equipment. Under such circumstances, the surfaces of the light shield disposed in alignment with the light sensitive device or devices will be rendered light absorbing by the use of suitable coatings or other materials productive of the same result. The introduction of a brush having dark bristles adjacent the path of the work strip in alignment with the light sensitive devices has served admirably for the purpose, particularly where the bristles are permitted to overlie the work path to a slight degree, small enough to permit inspection of the work to within a fraction of an inch of its very edges.

The invention may be characterized as providing in combination with a pinhole detector providing a path to be traversed by a strip of metal and having a light source and a light sensitive device substantially aligned on opposite sides of the path; a light shield transversely movably mounted with respect to the path, guide means carried by the shield adjacent the path for positioning it relative to an edge of the metal strip, the shield providing light absorbing surfaces proximate to the path protecting the light sensitive device against stray light.

The light absorbing material may be defined by a plurality of flexible filaments such as bristles in the form of a brush projecting into the path, both above and below it, thus partially overlying the path.

By interposing a mask between a substantial portion of the guide means and the light sensitive device, even where the guide means includes a roller, only a small segment thereof will project beyond the mask for engagement with the strip material, and since such engaging portion will assume a position in contact with or very closely adjacent to the strip, any light reflected therefrom will not be directed towards the light sensitive device.

The guide means preferably includes elements disposed forwardly and rearwardly along the path of the work relative to the light sensitive device, the elements preferably assuming the form of rollers and preferably being yieldably mounted relative to the light shield to accommodate movement produced by the strip.

It is preferable that all portions of the shield whose surfaces could reflect light from about the metal work strip to the photosensitive equipment below it, be masked or otherwise rendered non-reflective by the proper selection of materials or coatings.

A more complete understanding of the invention will follow from a description of the accompanying drawing wherein.

Figure 1:
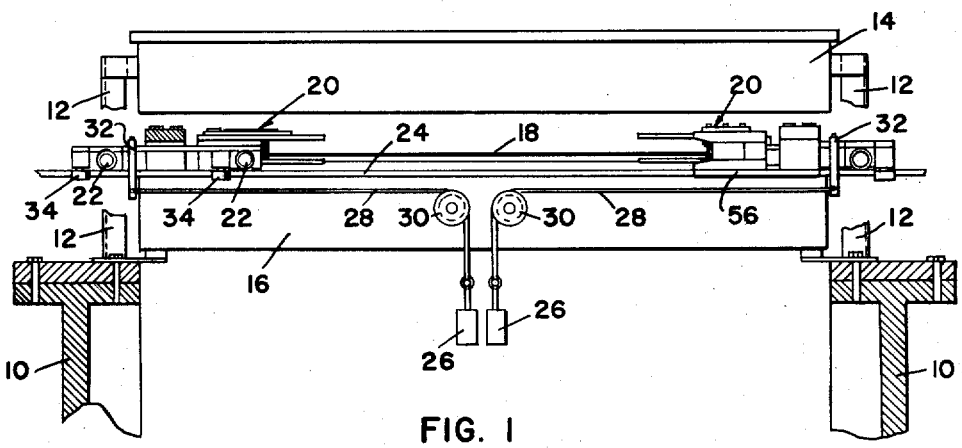
FIG. 1 is a fragmentary elevation, partially in section depicting the application of the light shield of the present invention to a pinhole detector.

The pinhole detector is supported on a frame 10 by means of suitable brackets 12 and includes a light source housing 14 and a photosensitive device housing 16 disposed in alignment on opposite sides of a path 18 traversed by the metal strip to be inspected. A pair of carriages 20 provided with rollers 22 engaging a track 24 are biased towards one another by means of weights 26 on the ends of cables 28 trained over pulleys 30 and having their opposite ends secured to the carriages by means of brackets 32. To avoid undesirable movement in the direction of the traveling metal strip, the carriage 20 is provided with rollers 34 rotatable about the axes of their vertical shafts 36 for engagement with the vertical surfaces of the track 24.

Figure 2:
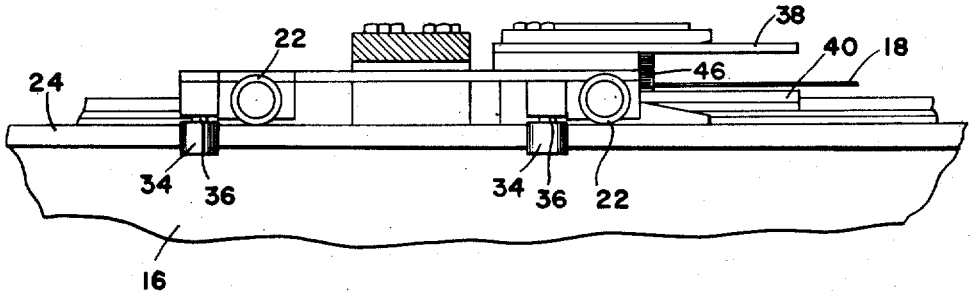
FIG. 2 is a fragmentary elevation taken along line 2—2 of FIG. 3, depicting on an enlarged scale a portion of the apparatus shown in FIG. 1.
Figure 3:
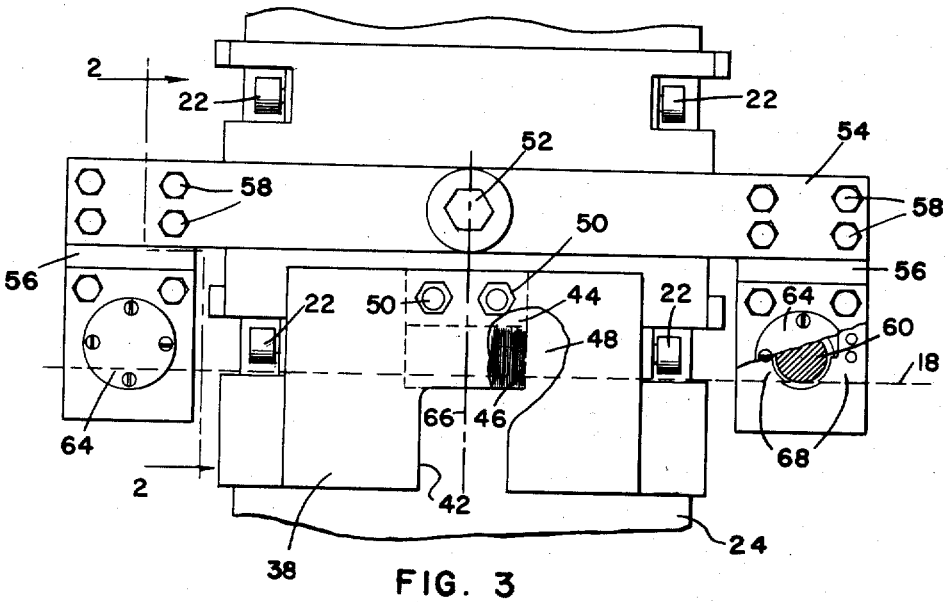
FIG. 3 is a fragmentary plan view showing one of the light shields of FIG. 1.
Figure 4:
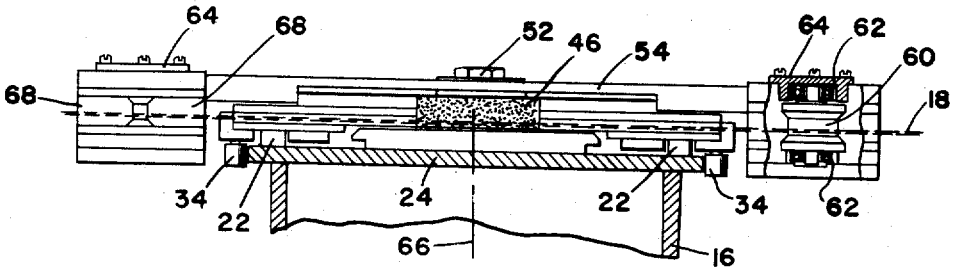
FIG. 4 is a fragmentary front elevation, partially in section, of one of the light shields.

Each carriage is provided with an upper guide plate 38 and a lower guide plate 40 containing aligned slots 42, as clearly shown in FIG. 3 extending almost to the extreme edge of the path of the strip metal work in order that the scanning and detection of pinholes can be effective over the entire useful surface of the material undergoing inspection. Interposed between the upper and lower guide plates, the carriage supports a brush 44 whose bristles 46 overlie the path 18 of the work, and as shown in FIGS. 2 and 4, extend both above and below the work. This brush is suitably mounted in a holder 48, secured to the carriage and to the guide plates 38 and 40 by means of suitable bolts 50.

Pivotally mounted on the carriage by means of a bolt or pivot 52 is an arm or whiffle tree 54 extending fore and aft of the carriage proper with reference to the direction of movement of the work to support a pair of arms 56 by means of bolts 58, the inwardly directed portions of the arms rotatably supporting flanged guide rollers 60 journaled in bearings 62 positioned by retainers 64. By thus disposing the guide rollers forwardly and rearwardly of a center line 66 shown in FIG. 3 and 4 indicating the position of alignment of the slots 42 with the housings for the light source and the photosensitive devices, reflection of light from any light source to the photosensitive devices from the guide rollers themselves is entirely avoided.

Removal of the brushes 44 from their sockets will still permit reasonably good results to occur provided that the sockets or cavities remaining are rendered light absorbing so that they will not reflect light from above the work to the photosensitive devices below it.

As clearly shown in FIG. 3, the guide rollers 60 are provided with shields or mass 68 beyond which they project only slightly for engagement with the edges of the metal strips, thus reducing even further the possibility of false marking through reflected light since any light impinging on the exposed portions of the guide rollers 60 would be reflected in a direction away from the light sensitive devices.

It will follow that movement of the carriages themselves towards and from the work is supplemented in the present case by pivotal movement of the arm 54 and its guide rollers 60 to compensate for irregularities in the work without necessitating such extreme movement of the carriages as would permit light to penetrate a gap that might be formed momentarily where a guide roller is rotated about a fixed pivot in the manner of the devices currently in use.

Whereas only one specific form of the invention has been illustrated and described, the invention should not be limited thereto beyond the scope of the appended claims.

I claim:

1. In combination with a pinhole detector providing a path to be traversed by a strip of metal and having a light source and a light sensitive device substantially aligned on opposite sides of said path; a light shield transversely movably mounted with respect to said path, guide means carried by said shield adjacent said path for positioning it relative to an edge of the metal strip, said shield providing light absorbing surfaces proximate to said path and in alignment with said light source and light sensitive device protecting said light sensitive device against reflected light, *wherein said light absorbing surfaces include a plurality of flexible filaments projecting into said path.*

2. The invention as set forth in claim 1 wherein portions of said light absorbing surfaces overlie said path.

[3. The invention as set forth in claim 1 wherein said light absorbing surfaces include a plurality of flexible filaments projecting into said path.]

4. The invention as set forth in claim [3] 1 wherein certain of said filaments extend above and others extend below said path.

5. The invention as set forth in claim 1 wherein said guide means includes an element misaligned with respect to said light source and light sensitive device.

6. The invention as set forth in claim 5 wherein a light absorbing mask is interposed between said guide means and light sensitive device.

7. The invention as set forth in claim 1 wherein said guide means includes a roller engageable with a strip of metal traversing said path and a mask interposed between a substantial portion of said roller and said light sensitive device.

8. The invention as set forth in claim 1 wherein said guide means includes rollers disposed forwardly and rearwardly along said path relative to said light source and light sensitive device.

9. The invention as set forth in claim 8 wherein said rollers are yieldably mounted relative to said light shield to accommodate movement produced by said strip.

10. The invention as set forth in claim 8 wherein masks are interposed between substantial portions of each of said rollers and said light sensitive device.

*11. In a pinhole detector of the type providing a path to be traversed by a strip of metal and having a light source and a light sensitive device substantially aligned on opposite sides of said path; an improvement comprising a light shield transversely movably mounted with respect to said path, and guide means carried by said shield adjacent said path for positioning it relative to an edge of the metal strip, said light shield providing light absorbing surfaces proximate to said path and in alignment with said light source and light sensitive device protecting said light sensitive device against reflected light, said light absorbing surfaces including a plurality of flexible filaments projecting into said path.*

References Cited in the file of this patent or the original patent

UNITED STATES PATENTS

| | | |
|---|---|---|
| 1,988,556 | Hunter | Jan. 22, 1935 |
| 1,996,481 | Morgan | Apr. 2, 1935 |
| 2,395,181 | Hago | Feb. 19, 1946 |
| 2,739,503 | Nieman et al. | Mar. 27, 1956 |